US012683379B2

(12) United States Patent
Asaba et al.

(10) Patent No.:     US 12,683,379 B2
(45) Date of Patent:           Jul. 14, 2026

(54) OVERCURRENT PROTECTION DEVICE AND CHARGING DEVICE

(71) Applicants: TOYOTA JIDOSHA KABUSHIKI KAISHA, Toyota (JP); DENSO CORPORATION, Kariya-city (JP)

(72) Inventors: Kotaro Asaba, Nagoya (JP); Daisuke Ueo, Toyota (JP); Nobutaka Tanaka, Nagoya (JP); Junya Matsushita, Toyota (JP); Yohei Imai, Kariya-city (JP); Ryota Tanabe, Kariya-city (JP)

(73) Assignees: TOYOTA JIDOSHA KABUSHIKI KAISHA, Toyota (JP); DENSO CORPORATION, Kariya (JP)

( * ) Notice: Subject to any disclaimer, the term of this patent is extended or adjusted under 35 U.S.C. 154(b) by 195 days.

(21) Appl. No.: 18/522,413

(22) Filed:     Nov. 29, 2023

(65)                Prior Publication Data

US 2024/0204505 A1      Jun. 20, 2024

(30)          Foreign Application Priority Data

Dec. 15, 2022     (JP) ................................. 2022-200243

(51) Int. Cl.
H02H 3/087          (2006.01)
H02H 1/00          (2006.01)
                (Continued)
(52) U.S. Cl.
CPC .......... *H02H 3/087* (2013.01); *H02H 1/0007* (2013.01); *H02J 7/62* (2026.01); *H02J 2105/37* (2026.01)

(58) Field of Classification Search
CPC ........ H02H 3/087; H02H 1/00; H02H 1/0007; H02H 3/16; H02H 3/08; H02H 3/32;
                (Continued)

(56)                References Cited

U.S. PATENT DOCUMENTS

2011/0301772 A1*  12/2011  Zuercher .................. H02H 7/20
                                                        700/292
2012/0175961 A1*   7/2012  Har-Shai .................. H02H 7/20
                                                        307/80

(Continued)

FOREIGN PATENT DOCUMENTS

JP          H11-122819 A      4/1999
JP          2013-031348 A      2/2013

*Primary Examiner* — Danny Nguyen
(74) *Attorney, Agent, or Firm* — Oliff PLC

(57)                ABSTRACT

An overcurrent protection device includes a first input terminal, a second input terminal, a first output terminal, a second output terminal, a breaker, a current sensor, and a comparator. A positive terminal and a negative terminal of a power source are connected to the first input terminal and the second input terminal. The second output terminal is connected to the second input terminal. The breaker includes a switch connected between the first input terminal and the first output terminal and opening upon reception of an interrupt command signal. The current sensor measures a difference between a current flowing between the first input terminal and the first output terminal, and a current flowing between the second input terminal and the second output terminal. The comparator sends the interrupt command signal to the breaker when a measurement value of the current sensor exceeds a first current threshold value.

6 Claims, 4 Drawing Sheets

(51) Int. Cl.
 *H02J 7/62* (2026.01)
 *H02J 105/37* (2026.01)
(58) Field of Classification Search
 CPC ...... H02J 7/00; H02J 7/00304; H02J 2310/48;
  H02J 7/0031; G06F 1/28; G01R 19/10
 USPC .......................................................... 361/42
 See application file for complete search history.

(56) References Cited

U.S. PATENT DOCUMENTS

| | | | | |
|---|---|---|---|---|
| 2014/0347769 A1* | 11/2014 | Kanda | .................... | H02H 3/16 |
| | | | | 361/42 |
| 2015/0288167 A1* | 10/2015 | Stepanek | ................ | H02H 7/10 |
| | | | | 361/42 |
| 2016/0118784 A1 | 4/2016 | Saxena et al. | | |
| 2017/0062876 A1* | 3/2017 | Narla | .................... | B60L 3/0046 |
| 2022/0060013 A1* | 2/2022 | Zhou | ........................ | H02H 3/08 |
| 2022/0106056 A1* | 4/2022 | Oms | ...................... | B64D 41/00 |

* cited by examiner

OVERCURRENT PROTECTION DEVICE AND CHARGING DEVICE

CROSS-REFERENCE TO RELATED APPLICATION

This application claims priority to Japanese Patent Application No. 2022-200243 filed on Dec. 15, 2022, incorporated herein by reference in its entirety.

BACKGROUND

1. Technical Field

The technology disclosed in the present specification relates to an overcurrent protection device, and to a charging device that is equipped with the overcurrent protection device.

2. Description of Related Art

Electrical devices through which great amounts of electric power flow are equipped with overcurrent protection functions. Japanese Unexamined Patent Application Publication No. 2013-31348 (JP 2013-31348 A) discloses a charger that is equipped with an overcurrent protection function. The charger disclosed in JP 2013-31348 A includes a main unit, a connector, and a cable connecting the main unit and the connector. Each of the main unit and the connector is provided with a breaker that opens when a current exceeding a current threshold value flows therein. When an electrical fault occurs in the main unit, the breaker of the main unit opens. When an electrical fault occurs in a device connected to the connector, the breaker in the connector opens. In either case, no overcurrent flows through the cable.

SUMMARY

A general overcurrent protection device is referred to as a surge protection device (SPD), and is designed to interrupt current instantaneously when a significantly excessive current flows. The SPD is placed on each of a positive line and a negative line.

A power source and an electrical device are connected by the positive line and the negative line, and when a ground fault occurs at the positive line near the power source, a ground fault path of positive terminal of the power source—ground—negative terminal of the electrical device—negative line—negative terminal of the power source is formed. At this time, no overcurrent flows on the positive line. Similarly, when a ground fault occurs at the negative line near the power source, no overcurrent flows on the negative line. An assumption will be made that a maximum current of 500 A flows over each of the positive line and negative line in normal operation. The tripping current of the SPD is set to 600 A. When a ground fault occurs while a current of 100 A is flowing over the positive line and the negative line, and 500 A flows only over the positive line, the SPD will not operate. However, it is desirable to interrupt the electric power line over which overcurrent is flowing, even in the event of such a ground fault. The present specification provides an overcurrent protection device that interrupts when a current difference between the positive line and the negative line exceeds a predetermined current threshold value (first current threshold value). In addition, the present specification also provides an overcurrent protection device that, when an overcurrent exceeding a second current threshold value (>first current threshold value) flows, interrupts the current instantaneously, and also interrupts the current when the current difference between the positive line and the negative line exceeds the first current threshold value. Further, the present specification also provides a charging device equipped with the above overcurrent protection device.

One aspect disclosed in the present specification provides an overcurrent protection device. The overcurrent protection device includes a first input terminal, a second input terminal, a first output terminal, a second output terminal, a breaker, a current sensor, and a comparator. One of a positive terminal and a negative terminal of a power source is connected to the first input terminal, and the other is connected to the second input terminal. The second output terminal is connected to the second input terminal. The breaker is connected between the first input terminal and the first output terminal. The breaker includes a switch that is configured to open upon reception of an interrupt command signal. When the switch opens, a current between the first input terminal and the first output terminal is interrupted. The current sensor is configured to measure a difference between the current flowing between the first input terminal and the first output terminal, and a current flowing between the second input terminal and the second output terminal. The comparator is configured to send the interrupt command signal to the breaker when a measurement value of the current sensor exceeds a first current threshold value.

The overcurrent protection device according to the above aspect interrupts the current between the first input terminal and the first output terminal when the difference between the currents flowing on the respective positive side and negative side exceeds the first current threshold value.

In the overcurrent protection device according to the above aspect, the breaker may include a protection circuit that is configured to open the switch when a current that exceeds a second current threshold value that is higher than the first current threshold value flows. The overcurrent protection device will not operate when a current above the first current threshold value but below the second current threshold value flows over each of a positive line and a negative line. When the current difference between the positive line and the negative line exceeds the first current threshold value, the overcurrent protection device operates to interrupt the current. The overcurrent protection device also operates to interrupt the current when an overcurrent exceeding the second current threshold value flows over both the positive line and the negative line. Note that when an overcurrent exceeding the second current threshold value flows over both the positive line and the negative line, the current difference is zero and the comparator does not output the interrupt command signal. This overcurrent protection device can interrupt current both in a situation in which a significantly high surge current flows, and in a situation in which an overcurrent flows in one of the positive line and the negative line due to a ground fault.

In the overcurrent protection device according to the aspect described above, a response speed of the protection circuit is preferably faster than a response speed of the comparator. When an overcurrent higher than the second current threshold value flows, the protection circuit of the breaker instantaneously operates, and the breaker opens. The protection circuit does not operate even when an overcurrent flows that is lower than the second current threshold value but higher than the first current threshold value. However, when an overcurrent lower than the second current threshold value but higher than the first current threshold value flows for a predetermined duration of time, the comparator operates and sends an interrupt command signal to the breaker. The breaker (switch) that receives the interrupt command signal opens to interrupt connection between the first input terminal and the first output terminal. This overcurrent protection device interrupts the current instantaneously when an overcurrent that exceeds the second current threshold value flows. This overcurrent protection device also interrupts the current when a current difference (a current difference between the positive line and the negative line) that is lower than the second current threshold value but exceeds the first current threshold value flows for a predetermined duration of time. When the current difference below the second current threshold value but above the first current threshold value does not last for the predetermined duration of time, the breaker will not operate.

The overcurrent protection device of the above aspect preferably further includes a sub-breaker. The sub-breaker may be connected between the second input terminal and the second output terminal. The sub-breaker may include a sub-switch that is configured to open when receiving the interrupt command signal. The sub-breaker may also include a sub-protection circuit that is configured to open the sub-switch when a current that exceeds the second current threshold value flows. The comparator may be configured to send the interrupt command signal to both the breaker and the sub-breaker when the measurement value of the current sensor exceeds the first current threshold value. By providing the sub-breaker, both the positive line and the negative line can be interrupted when the current difference between the positive line and the negative line exceeds the first current threshold value.

The protection circuit of the breaker may be configured to send the interrupt command signal to the sub-breaker when detecting a current exceeding the second current threshold value, and the sub-protection circuit of the sub-breaker may be configured to send the interrupt command signal to the breaker when detecting a current exceeding the second current threshold value. In this case, when a current exceeding the second current threshold value flows through one of the breaker and the sub-breaker, both the breaker and the sub-breaker operate.

Another aspect of the present specification also provides a charger that is equipped with the overcurrent protection device described above. The charger includes a boost converter that includes a low voltage terminal and a high voltage terminal, and a protection ground line. The boost converter boosts a voltage of electric power input to the low voltage terminal, and performs output thereof from the high voltage terminal. A first output terminal and a second output terminal of the overcurrent protection device are respectively connected to a positive terminal and a negative terminal of the low voltage terminal. A battery that is charged with electric power from the power source is connected to the high voltage terminal of the boost converter. The protection ground line connects a ground terminal of a device equipped with the battery, and a ground terminal of the power source. This charger can suppress overcurrent from flowing over the protection ground line by operating the overcurrent protection device when a ground fault occurs.

Details and further improvements of the technique disclosed in the present specification will be described in the section "DETAILED DESCRIPTION OF EMBODIMENTS" below.

BRIEF DESCRIPTION OF THE DRAWINGS

Features, advantages, and technical and industrial significance of exemplary embodiments of the invention will be described below with reference to the accompanying drawings, in which like signs denote like elements, and wherein.

DETAILED DESCRIPTION OF EMBODIMENTS

First Embodiment

Figure 1:
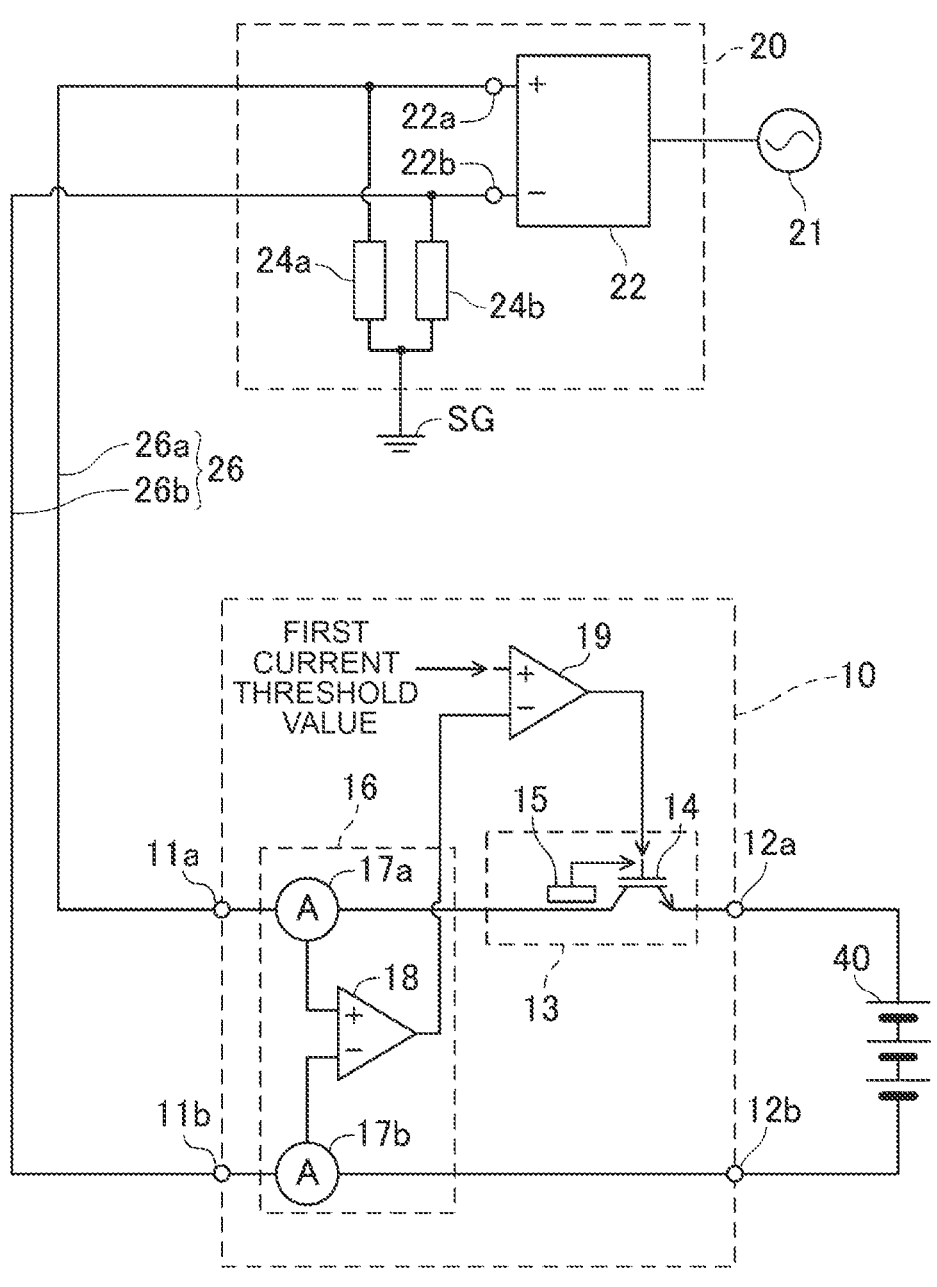
FIG. 1 is a block diagram of an overcurrent protection device according to a first embodiment.

An overcurrent protection device 10 according to a first embodiment will be described with reference to FIGS. 1 and 2. FIG. 1 is a block diagram of the overcurrent protection device 10. The overcurrent protection device 10 is connected between a power source 20 and a battery 40 when the power source 20 charges the battery 40. The power source 20 includes an alternating current (AC)/direct current (DC) converter 22 that converts alternating current electric power from an alternating current power source 21 into direct current electric power. Output terminals of the AC/DC converter 22 are connected to input terminals (first input terminal 11a and second input terminal 11b) of the overcurrent protection device 10 by an electric power line 26.

One end of a positive line 26a of the electric power line 26 is connected to a positive terminal 22a of an output end of the AC/DC converter 22. One end of a negative line 26b of the electric power line 26 is connected to a negative terminal 22b of the output end of the AC/DC converter 22. The positive line 26a is also connected to a ground SG via an SPD 24a. The negative line 26b is also connected to the ground SG via an SPD 24b. "SPD" is an abbreviation for "Surge Protection Device". The SPD 24a (SPD 24b) connects the positive line 26a (negative line 26b) to the ground SG when an excessive current flows over the positive line 26a (negative line 26b) to direct the overcurrent to the ground SG, thereby protecting the AC/DC converter 22.

The overcurrent protection device 10 includes the first input terminal 11a, the second input terminal 11b, a first output terminal 12a, a second output terminal 12b, a breaker 13, a current sensor 16, and a comparator 19. The first input terminal 11a is connected to the positive line 26a (positive terminal 22a), and the second input terminal 11b is connected to the negative line 26b (negative terminal 22b). The battery 40 is connected to the first output terminal 12a and the second output terminal 12b.

The second input terminal 11b is connected to the second output terminal 12b. The breaker 13 is connected between the first input terminal 11a and the first output terminal 12a. The breaker 13 has a switching device 14 and a protection circuit 15. The switching device 14 is normally closed. The protection circuit 15 monitors the current flowing through the switching device 14 and opens the switching device 14 when a current exceeding the second current threshold value flows through the switching device 14. Here, to "close the switching device 14" means to conduct at both ends of the switching device 14. To "open the switching device 14" means to interrupt between both ends of the switching device 14. The protection circuit is well known, and accordingly detailed description of the circuit will be omitted.

The current sensor 16 includes a first current sensor 17a that measures the current flowing between the first input terminal 11a and the first output terminal 12a, a second current sensor 17*b* that measures the current flowing between the second input terminal 11*b* and the second output terminal 12*b*, and a differentiator 18 are provided. The differentiator 18 outputs the difference between a measured value of the first current sensor 17*a* and a measured value of the second current sensor 17*b*. That is to say, the differentiator 18 outputs the difference (current difference) between the current flowing between the first input terminal 11*a* and the first output terminal 12*a*, and the current flowing between the second input terminal 11*b* and the second output terminal 12*b*. In other words, the measured value (output) of the current sensor 16 corresponds to the current difference. Hereinafter, the difference between the current flowing between the first input terminal 11*a* and the first output terminal 12*a*, and the current flowing between the second input terminal 11*b* and the second output terminal 12*b*, may simply be referred to as "current difference". The current difference may be expressed as "difference between the current flowing over the positive line 26*a* and the current flowing over the negative line 26*b*".

An output end of the differentiator 18 is connected to one input end of the comparator 19. A first current threshold value is input to the other input end of the comparator 19. An output end of the comparator 19 is connected to a gate of the switching device 14 of the breaker 13. The comparator 19 outputs an interrupt command signal when the current difference exceeds the first current threshold value. As previously mentioned, the switching device 14 is normally closed. When the interrupt command signal is input to the gate, the switching device 14 opens. In other words, the switching device 14 is closed before the interrupt command signal is input.

Note that the comparator 19 that outputs the interrupt command signal continues to output the interrupt command signal until receiving a reset signal. That is to say, the switching device 14 that opens upon receiving the interrupt command signal maintains the open state until the comparator 19 receives the reset signal.

As long as no overcurrent flows, electric power is supplied from the power source 20 to the battery 40 through the overcurrent protection device 10, and the battery 40 is charged.

The second current threshold value is set to a value that is greater than the first current threshold value. The breaker 13 opens under each of two types of overcurrent. The breaker 13 opens when a current exceeding the second current threshold value flows over the positive line 26*a*. The breaker 13 also opens when the current difference exceeds the first current threshold value.

When short-circuiting occurs anywhere in a circuit connecting the power source 20 and the battery 40, a current exceeding the second current threshold value instantaneously flows over the positive line 26*a* and the negative line 26*b*. In such a case, the protection circuit 15 operates and the switching device 14 opens. That is to say, the overcurrent protection device 10 operates.

When a ground fault occurs at the battery 40, and the ground fault path is connected between the battery 40 and the power source 20, overcurrent may flow over one of the positive line 26*a* and the negative line 26*b*. FIG. 2 shows an example of a ground fault path GFP when there is a ground fault of a negative terminal of the battery 40.

Figure 2:
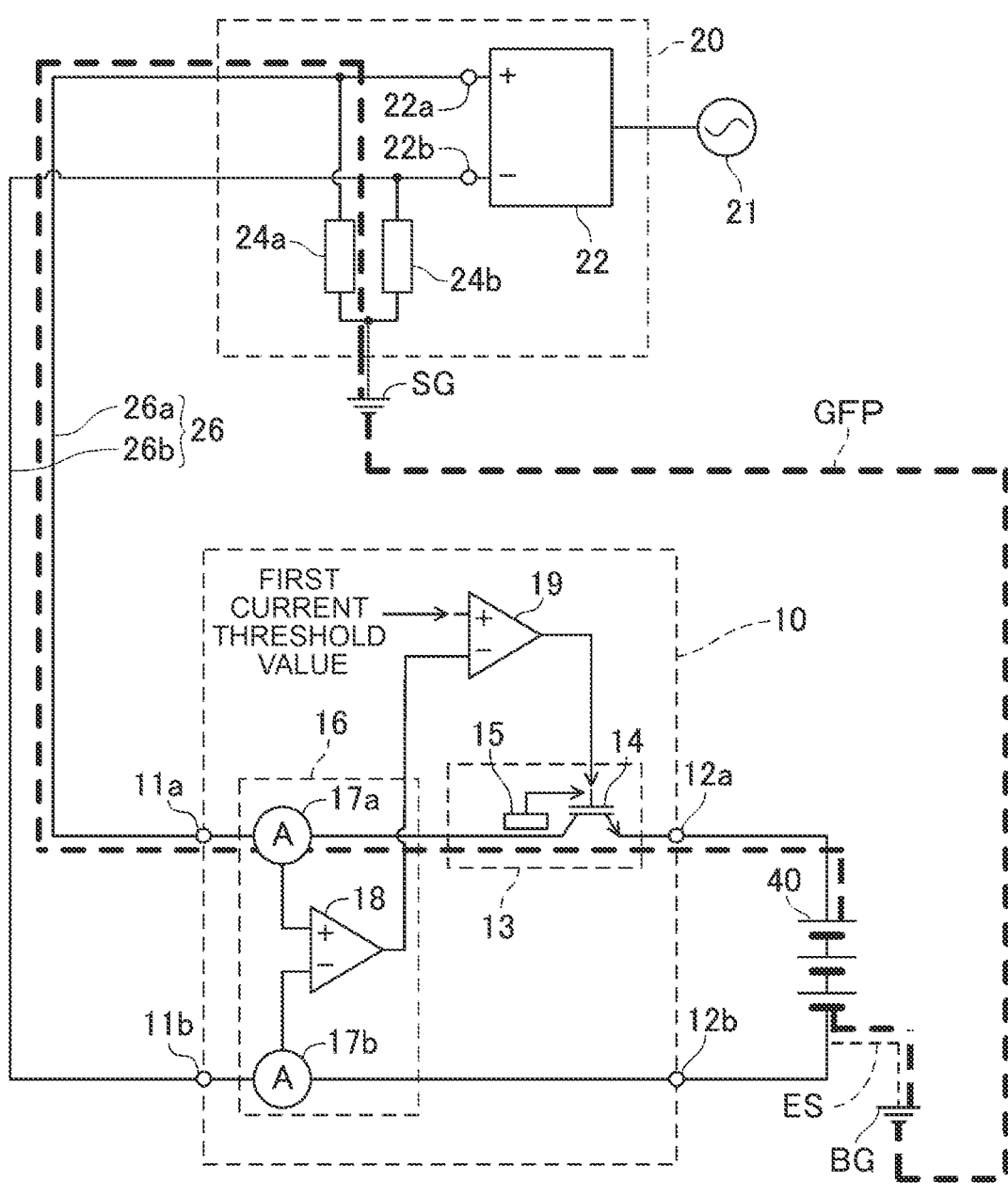
FIG. 2 is a diagram showing an example of a ground fault path of a current.

A thin dotted line ES in FIG. 2 indicates the location of the ground fault, indicating that the negative terminal of the battery 40 is connected to a ground BG. A thick dashed line in FIG. 2 indicates the ground fault path GFP. The ground fault path GFP goes through negative terminal of the battery 40—ground BG on the side of the battery 40—ground SG on the side of the power source 20—SPD 24*a*—positive line 26*a*—first input terminal 11*a*—switching device 14—first output terminal 12*a*—positive terminal of the battery 40. Note that it is assumed that the SPD 24*a* is also short-circuited due to the ground fault. As shown in FIG. 2, no overcurrent flows over the negative line 26*b* at this time. When the overcurrent flowing only over the positive line 26*a* is lower than the second current threshold value, the protection circuit 15 of the breaker 13 does not operate. However, when the current difference (the difference between the currents flowing over the positive line 26*a* and the negative line 26*b*) exceeds the first current threshold value (<second current threshold value), the comparator 19 sends an interrupt command signal to the switching device 14, and the switching device 14 opens. That is to say, the overcurrent protection device 10 operates. A high resistance of the ground fault path GFP can result in a current difference lower than the second current threshold value.

The overcurrent protection device 10 of the first embodiment operates under two types of overcurrent, as described above. Despite operating under two types of overcurrent, there is one switch (switching device 14) for interrupting the current. The technology according to the embodiment can inexpensively realize an overcurrent protection device that interrupts current under two types of overcurrent.

Response speed of the comparator 19 is slower than response speed of the protection circuit 15. The protection circuit 15 instantaneously opens the switching device 14 when detecting a current exceeding the second current threshold value. The comparator 19 outputs an interrupt command signal when the duration over which the current difference exceeding the first current threshold value exceeds a predetermined amount of time. The overcurrent protection device 10 interrupts off the current instantaneously when there is a high overcurrent (current exceeding the second current threshold value), and interrupts the current after a predetermined duration has elapsed when there is a low overcurrent (current difference exceeding the first current threshold value).

Second Embodiment

Figure 3:
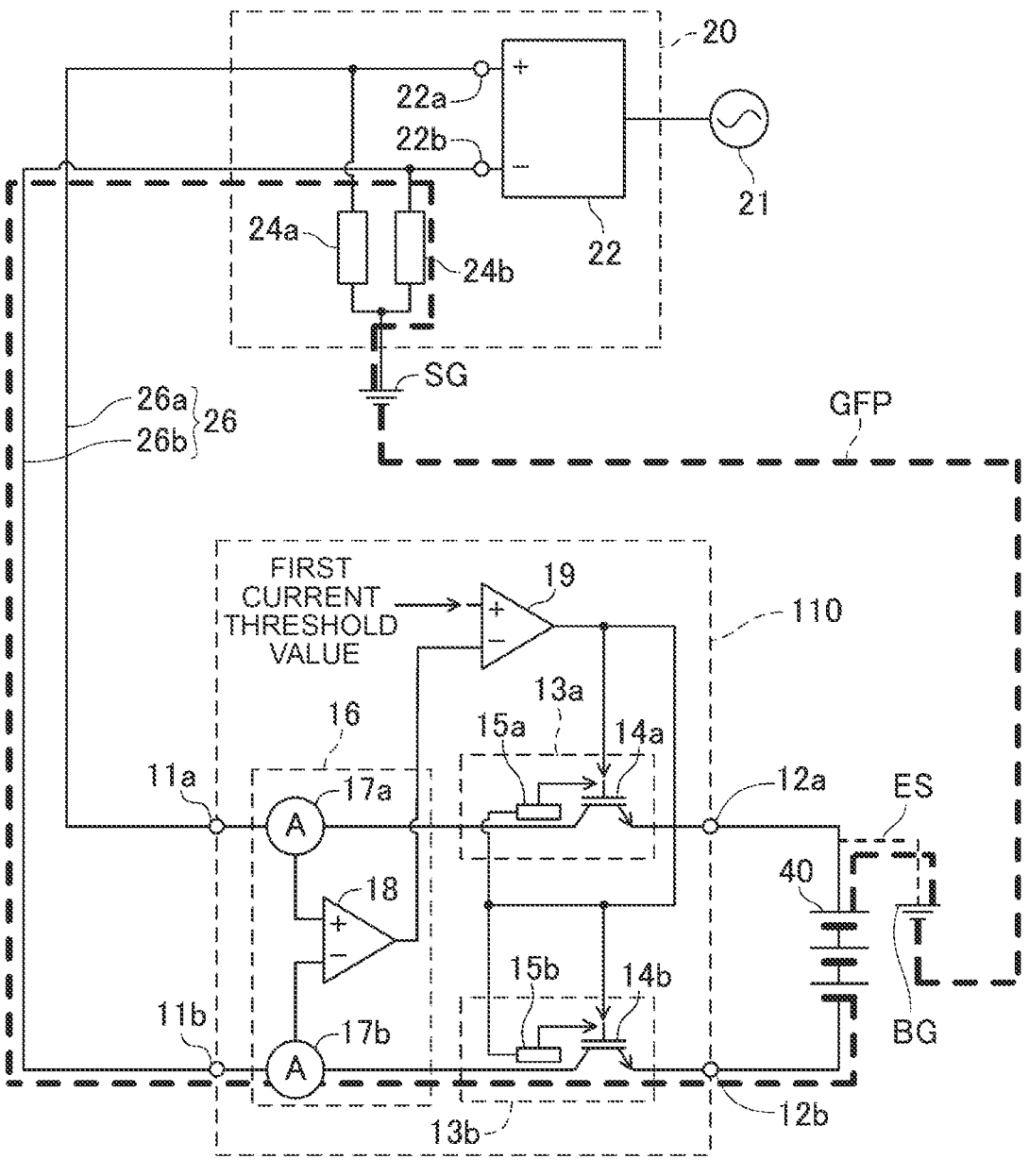
FIG. 3 is a block diagram of an overcurrent protection device according to a second embodiment.

FIG. 3 is a block diagram of an overcurrent protection device 110 according to a second embodiment. The overcurrent protection device 110 is connected between the power source 20 and the battery 40 in the example in FIG. 3 as well. As long as no overcurrent flows, electric power is supplied from the power source 20 to the battery 40 through the overcurrent protection device 110, and the battery 40 is charged.

The overcurrent protection device 110 includes a breaker 13*b* on the side of the negative line 26*b*, in addition to the configuration of the overcurrent protection device 10 in FIG. 1. In the second embodiment, the breaker connected to the positive line 26*a* will be referred to as "main breaker 13*a*", and the breaker connected to the negative line 26*b* will be referred to as "sub-breaker 13*b*". The main breaker 13*a* is connected between the first input terminal 11*a* and the first output terminal 12*a*, and the sub-breaker 13*b* is connected between the second input terminal 11*b* and the second output terminal 12*b*. The breaker 13*b* may be referred to as "main breaker", and the breaker 13*a* may be referred to as "sub-breaker".

The structure of the main breaker 13*a* is as described earlier. The structure of the sub-breaker 13*b* is the same as that of the main breaker 13*a*. That is to say, the sub-breaker 13*b* includes a switching device 14*b* and a protection circuit 15*b*. The switching device 14*b* is normally closed. The protection circuit 15*b* monitors the current flowing through the switching device 14*b*, and opens the switching device 14*b* when a current exceeding the second current threshold value flows through the switching device 14*b*.

The overcurrent protection device 110 of the second embodiment has the following structure as well. When a current exceeding the second current threshold value flows through a switching device 14*a*, a protection circuit 15*a* of the main breaker 13*a* opens the switching device 14*b* and at the same time sends an interruption command signal to the sub-breaker 13*b* (switching device 14*b*). Also, when a current exceeding the second current threshold value flows through the switching device 14*b*, the protection circuit 15*b* of the sub-breaker 13*b* opens the switching device 14*a* and at the same time sends an interruption command signal to the main breaker 13*a* (switching device 14*a*). That is to say, in the overcurrent protection device 110 according to the second embodiment, both the main breaker 13*a* and the sub-breaker 13*b* operate when a current exceeding the second current threshold value flows over one of the positive line 26*a* and the negative line 26*b*. In other words, when a current exceeding the second current threshold value flows over one of the positive line 26*a* and the negative line 26*b*, both the main breaker 13*a* and the sub-breaker 13*b* interrupt the current.

Also, the output end of the comparator 19 is connected to the gate of the switching device 14*a* of the main breaker 13*a*, and the gate of the switching device 14*b* of the sub-breaker 13*b*. That is to say, in the overcurrent protection device 110, when the current difference exceeds the first current threshold value, an interruption command signal is sent to both the main breaker 13*a* (switching device 14*a*) and the sub-breaker 13*b* (switching device 14*b*). That is to say, when the current difference exceeds the first current threshold value, both the main breaker 13*a* and the sub-breaker 13*b* interrupt the current.

FIG. 3 shows a ground fault path when there is a ground fault of a positive end of the battery 40 to the ground BG. The thin dotted line ES represents the ground fault between the positive terminal of the battery 40 and the ground BG. A thick dashed line indicates the ground fault path GFP. The ground fault path GFP is goes through positive terminal of the battery 40—ground BG on the side of the battery 40—ground SG on the side of the power source 20—SPD 24*b*—negative line 26*b*—second input terminal 11*b*—switching device 14*b*—second output terminal 12*b*—negative terminal of the battery 40. Note that it is assumed that the SPD 24*b* is also short-circuited due to the ground fault. As shown in FIG. 3, no overcurrent flows over the positive line 26*a* at this time. In the case in FIG. 3, when the current difference exceeds the first current threshold value, both the main breaker 13*a* and the sub-breaker 13*b* interrupt the current.

Third Embodiment

A third embodiment will be described with reference to FIG. 4. The third embodiment is a charging device 30 that uses the overcurrent protection device 110 according to the second embodiment. The charging device 30 is installed in a battery electric vehicle 50. The battery electric vehicle 50 travels by driving a traction motor 53 with electric power of a battery 51. The battery 51 is connected to a direct current end of an electric power converter 52 via a relay 55. The traction motor 53 is connected to an alternating current end of the electric power converter 52. The electric power converter 52 converts the direct current electric power output by the battery 51 into driving electric power (alternating current power) for the traction motor 53. The charging device 30 is used when charging the battery 51 of the battery electric vehicle 50 with the power source 20 that is an external power source.

The charging device 30 includes the overcurrent protection device 110 according to the second embodiment, a boost converter 31, and a protection ground line 26*c*. The overcurrent protection device 110 has already been described, and accordingly description thereof will be omitted here.

The first input terminal 11*a* and the second input terminal 11*b* of the overcurrent protection device 110 are connected to the positive terminal 22*a* and the negative terminal 22*b* of the power source 20 via the electric power line 26. The power source 20 and the battery electric vehicle 50 are connected by the electric power line 26. A charging socket 56 is provided to a body of the battery electric vehicle 50, and a charging plug 25 of the electric power line 26 extending from the power source 20 is connected to the charging socket 56. The electric power line 26 includes the positive line 26*a*, the negative line 26*b*, and the protection ground line 26*c*. For the sake of convenience in description, the line connected to the positive line 26*a* inside the overcurrent protection device 110 will also be referred to as "positive line 26*a*", and the line connected to the negative line 26*b* will also be referred to as "negative line 26*b*". A line connected to the protection ground line 26*c* inside the overcurrent protection device 110 will also be referred to as "protection ground line 26*c*".

The first output terminal 12*a* and the second output terminal 12*b* of the overcurrent protection device 110 are connected to low-voltage terminals 32 (positive terminal 32*a* and negative terminal 32*b*) of the boost converter 31. The boost converter 31 boosts voltage of the electric power input to the low voltage terminals 32 and performs output thereof from high voltage terminals 33 (positive terminal 33*a* and negative terminal 33*b*). The battery 51 of the battery electric vehicle 50 is connected to the high voltage terminals 33. A relay 54 is connected between the high voltage terminals 33 and the battery 51. Note that a relay 36 is connected between the overcurrent protection device 110 and the power source 20.

The boost converter 31 includes two switching devices 34*a* and 34*b* and a reactor 35. The negative terminal 32*b* of the low voltage terminals 32 of the boost converter 31 is connected to the negative terminal 33*b* of the high voltage terminals 33. The two switching devices 34*a* and 34*b* are connected in series. A series connection of the two switching devices 34*a* and 34*b* has a high potential side thereof connected to the positive terminal 33*a* of the high voltage terminals and a low potential side thereof connected to the negative terminal 33*b* of the high voltage terminals 33. One end of the reactor 35 is connected to the positive terminal 32*a* of the low voltage terminals 32, and the other end is connected to a midpoint of the series connection. The boost converter 31 in FIG. 4 boosts the voltage of the electric power applied to the low voltage terminals 32 and performs output thereof from the high voltage terminals 33. The power source 20 is connected to the low voltage terminals 32 via the overcurrent protection device 110.

Figure 4:
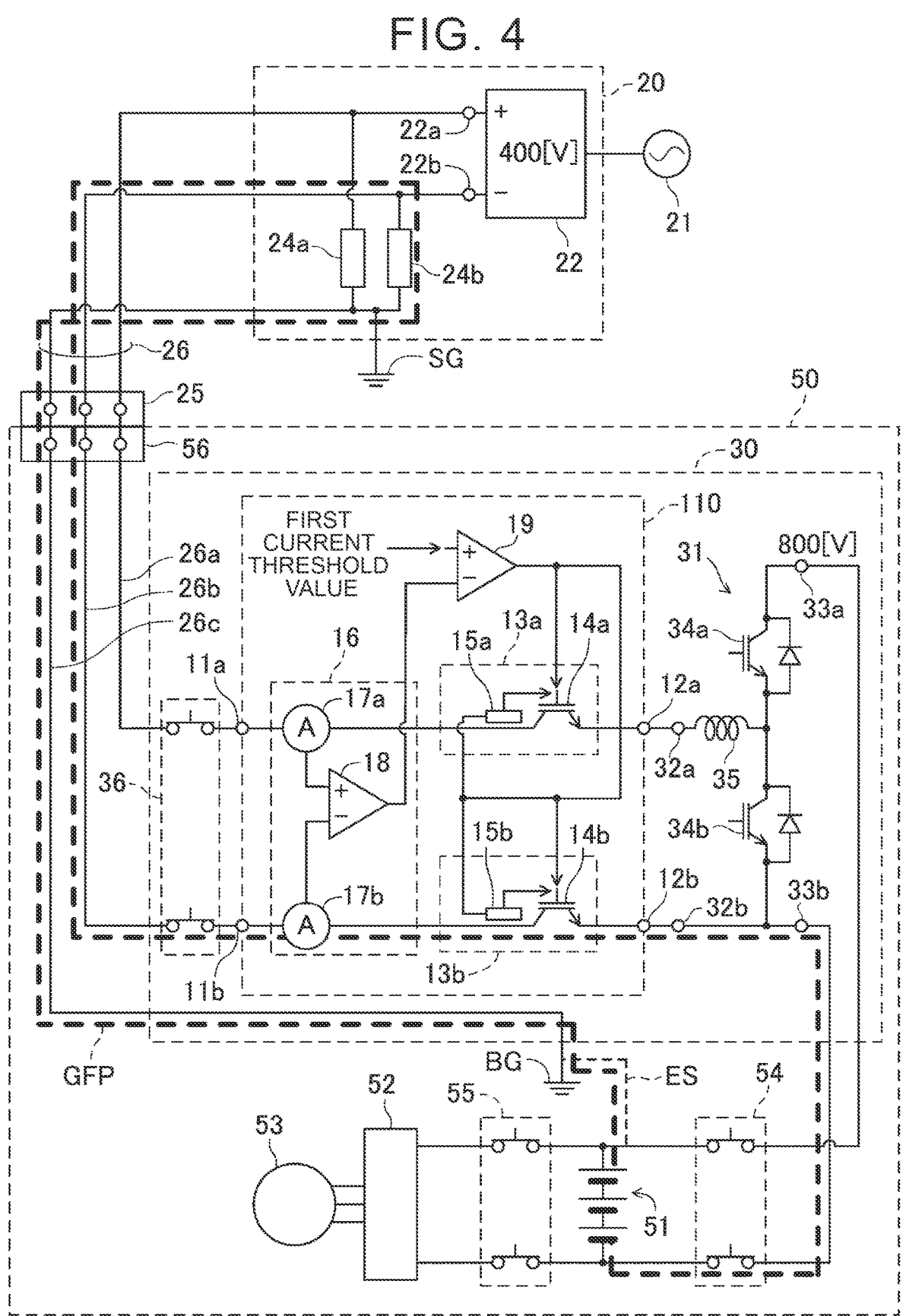
FIG. 4 is a block diagram of an overcurrent protection device according to a third embodiment.

In the example in FIG. 4, output voltage of the power source 20 is 400 V. The boost converter 31 boosts the voltage of the electric power input to the low voltage terminals 32 to double, and performs output thereof from the high voltage terminals 33. The output voltage of the power source 20 is 400 V, and accordingly the voltage of the electric power output from high voltage terminals 33 of the boost converter 31 is 800 V.

The charging device 30 is installed in the battery electric vehicle 50. A ground (body ground BG) of the battery electric vehicle 50 is normally isolated from the battery 51. The body ground BG of the battery electric vehicle 50 is connected to the ground SG of the power source 20 via the protection ground line 26*c*. The protection ground line 26*c* connects the body ground BG and the ground SG of the power source 20 via the charging socket 56 prepared in the battery electric vehicle 50, and the charging plug 25 of the electric power line 26.

As described above, in the overcurrent protection device 110, both of the breakers 13*a* and 13*b* are opened when overcurrent (current exceeding the second current threshold value) is detected at one of the protection circuits 15*a* and 15*b*. Also, both of the breakers 13*a* and 13*b* are opened when the current difference exceeds the first current threshold value, as well.

In the case of the configuration in FIG. 4, electric power of a maximum of 400 V flows between the power source 20 and the charging device 30 (low voltage terminals 32 of the boost converter 31). On the other hand, electric power of a maximum of 800 V flows between the charging device 30 (the high voltage terminals 33 of the boost converter 31) and the battery 51. FIG. 4 also shows a ground fault path GFP when a ground fault at a positive terminal of the battery 51 to the body ground BG occurs. The ground fault path GFP goes through positive terminal of the battery 51/body ground BG/protection ground line 26*c*/SPD 24*b* of the power source 20/negative line 26*b*/second input terminal 11*b*/switching device 14*b*/second output terminal 12*b*/negative terminal of the battery 51. Again, assumption will be made that a short-circuit fault is occurring at the SPD 24*b*. As indicated by the thick dotted line in FIG. 4, the ground fault current passes over the protection ground line 26*c* and the negative line 26*b*, but does not pass over the positive line 26*a*.

As described above, in the overcurrent protection device 110, the breakers 13*a* and 13*b* interrupt the current when an overcurrent exceeding the second current threshold value flows over one of the positive line 26*a* and the negative line 26*b*. That is to say, the overcurrent protection device 110 interrupts the current on both of the positive line 26*a* and the negative line 26*b*.

In a case of a ground fault, the current flowing over the ground fault path GFP may fall below the second current threshold value when there is a large resistance on the ground fault path GFP. In this case, the protection circuits 15*a*, 15*b* of the breakers 13*a*, 13*b* do not operate. As shown in FIG. 4, for example, when a ground fault occurs at the positive terminal of the battery 51, 800 V is applied to the SPDs 24*a* and 24*b*. The maximum output voltage of the power source 20 is 400 V, and accordingly the breakdown voltage of the SPDs 24*a* and 24*b* is around 500 V to 600 V. When 800 V is applied to the SPDs 24*a* and 24*b*, the probability that a short-circuit fault will occur at the SPDs 24*a* and 24*b* is high. When the SPDs 24*a*, 24*b* are short-circuited, the ground fault path GFP shown in FIG. 4 is formed. When a current having a current value exceeding the first current threshold value continues to flow over the protection ground line 26*c*, the protection ground line 26*c* may be damaged. As shown in FIG. 4, in this case the current difference is likely to exceed the first current threshold value. The overcurrent protection device 110 is operated when the current difference exceeds the first current threshold value. The overcurrent protection device 110 interrupts the current on each of the positive line 26*a* and the negative line 26*b*. Once the positive line 26*a* and the negative line 26*b* are interrupted, no current will flow over the protection ground line 26*c*, and the protection ground line 26*c* is protected.

Points to be noted regarding the technology described in the embodiments will be described. The detailed structure of the breaker 13 is as follows. The breaker 13 includes the switch (switching device 14) connected between the first input terminal 11*a* and the first output terminal 12*a*, and the protection circuit 15. The switch is normally closed. The protection circuit 15 opens the switch when the current flowing through the switch exceeds the second current threshold value.

The same applies to the protection circuits 15*a* and 15*b* according to the second and third embodiments. When a current exceeding the second current threshold value flows through the switching device 14*a*, the protection circuit 15*a* of the main breaker 13*a* opens the switching device 14*a* and also sends an interruption command signal to the sub-breaker 13*b* (switching device 14*b*). When a current exceeding the second current threshold value flows through the switching device 14*b*, the protection circuit 15*b* of the sub-breaker 13*b* opens the switching device 14*b* and also sends an interruption command signal to the main breaker 13*a* (switching device 14*a*). The protection circuit 15*b* corresponds to a sub-protection circuit.

The response speed of the protection circuits 15*a* and 15*b* is faster than the response speed of the comparator 19 in the second and third embodiments as well.

The power source may also be referred to as an electric power supply. That is to say, the power source may be a separate electrical device that supplies electric power to the electrical device. It is sufficient for one of the first input terminal 11*a* and the second input terminal 11*b* of the overcurrent protection devices 10 and 110 to be connected to the positive terminal of the power source, and the other terminal to be connected to the negative terminal of the power source.

Although specific examples of the invention are described in detail above, these are merely exemplary and are not intended to limit the scope of the claims. The technology described in the claims includes various modifications and alterations of the specific examples illustrated above. The technical elements illustrated in the present specification or the drawings exhibit technical utility alone or in various combinations, and are not limited to the combinations set forth in the claims as originally filed. The technology exemplified in the present specification or the drawings may also achieve a plurality of objects at the same time, and has technical utility by achieving one of the objects.

What is claimed is:

1. An overcurrent protection device comprising:
   a first input terminal that is connected to one of a positive terminal and a negative terminal of a power source;
   a second input terminal that is connected to the other one of the positive terminal and the negative terminal;
   a first output terminal;
   a breaker including a switch that is connected between the first input terminal and the first output terminal and that is configured to open when receiving an interrupt command signal;
   a second output terminal that is connected to the second input terminal;
   a current sensor that is configured to measure a difference between a current flowing between the first input terminal and the first output terminal, and a current flowing between the second input terminal and the second output terminal; and a comparator that is configured to send the interrupt command signal to the breaker when a measurement value of the current sensor exceeds a first current threshold value, wherein the breaker includes a protection circuit that is configured to open the switch when a current that exceeds a second current threshold value that is higher than the first current threshold value flows through the switch, and the protection circuit is separate and distinct from the current sensor and from the comparator.

2. The overcurrent protection device according to claim 1, wherein a response speed of the protection circuit is faster than a response speed of the comparator.

3. The overcurrent protection device according to claim 1, further comprising a sub-breaker including a sub-switch that is connected between the second input terminal and the second output terminal and that is configured to open when receiving the interrupt command signal, and a sub-protection circuit that is configured to open the sub-switch when a current that exceeds the second current threshold value flows, wherein the comparator is configured to send the interrupt command signal to the breaker and the sub-breaker when the measurement value of the current sensor exceeds the first current threshold value.

4. The overcurrent protection device according to claim 3, wherein:

the protection circuit of the breaker is configured to send the interrupt command signal to the sub-breaker when detecting a current exceeding the second current threshold value; and the sub-protection circuit of the sub-breaker is configured to send the interrupt command signal to the breaker when detecting a current exceeding the second current threshold value.

5. A charging device comprising:

the overcurrent protection device according to claim 1;

a boost converter that includes a low voltage terminal and a high voltage terminal, and that is configured to boost a voltage of electric power input to the low voltage terminal, in which the first output terminal and the second output terminal are connected to a positive terminal and a negative terminal of the low voltage terminal, respectively, and in which a battery to be charged is connectable to the high voltage terminal; and a protection ground line that connects a ground terminal of a device equipped with the battery, and a ground terminal of the power source.

6. The overcurrent protection device according to claim 1, wherein the comparator is an analog-to-digital circuit component performing a single task of comparing the measurement value of the current sensor and the first current threshold value, and an output of the comparator is the same node as a gate of the switch.

* * * * *